May 3, 1927.

P. H. BRACE 1,626,663

TEMPERATURE CONTROLLING SYSTEM

Filed Feb. 8, 1923

WITNESSES:

INVENTOR
Porter H. Brace.
BY
ATTORNEY

Patented May 3, 1927.

1,626,663

UNITED STATES PATENT OFFICE.

PORTER H. BRACE, OF WILKINSBURG, PENNSYLVANIA, ASSIGNOR TO WESTINGHOUSE ELECTRIC AND MANUFACTURING COMPANY, A CORPORATION OF PENNSYLVANIA.

TEMPERATURE-CONTROLLING SYSTEM.

Application filed February 8, 1923. Serial No. 617,766.

My invention relates to means for controlling temperature and more particularly to temperature control systems in which radiant energy emitted from a thermal member is impressed upon a photo-electrical cell which, in turn, controls the temperature of the thermal member.

One object of my invention is to provide temperature controlling means that do not require the use of thermo-couples or galvanometers.

Another object of my invention is to provide a system of temperature control that shall be suitable for use with the highest known temperatures.

Another object of my invention is to provide a system of temperature control that shall depend for its operation upon the radiant energy emitted from the thermal member under control.

It is a still further object of my invention to provide a thermally controlled member that is operable with either alternating or direct current.

In thermal control devices as heretofore constructed, it has been customary to employ thermo-couples or galvanometers which respond directly to the temperature of thermal members, such as furnaces, retorts and the like. The use of such control devices has been limited, due to the fact that the temperatures to be measured have exceeded the melting points of the thermo-couples or coils which have been directly exposed to the heat, even though elaborate cooling systems have been devised.

By my invention it is possible to measure such extremely high temperatures from a remote position by measuring the radiant energy, and more particularly the light rays, emitted from the thermal member.

In the several figures of the drawings, similar reference numerals indicate like parts.

Figures 1, 2:
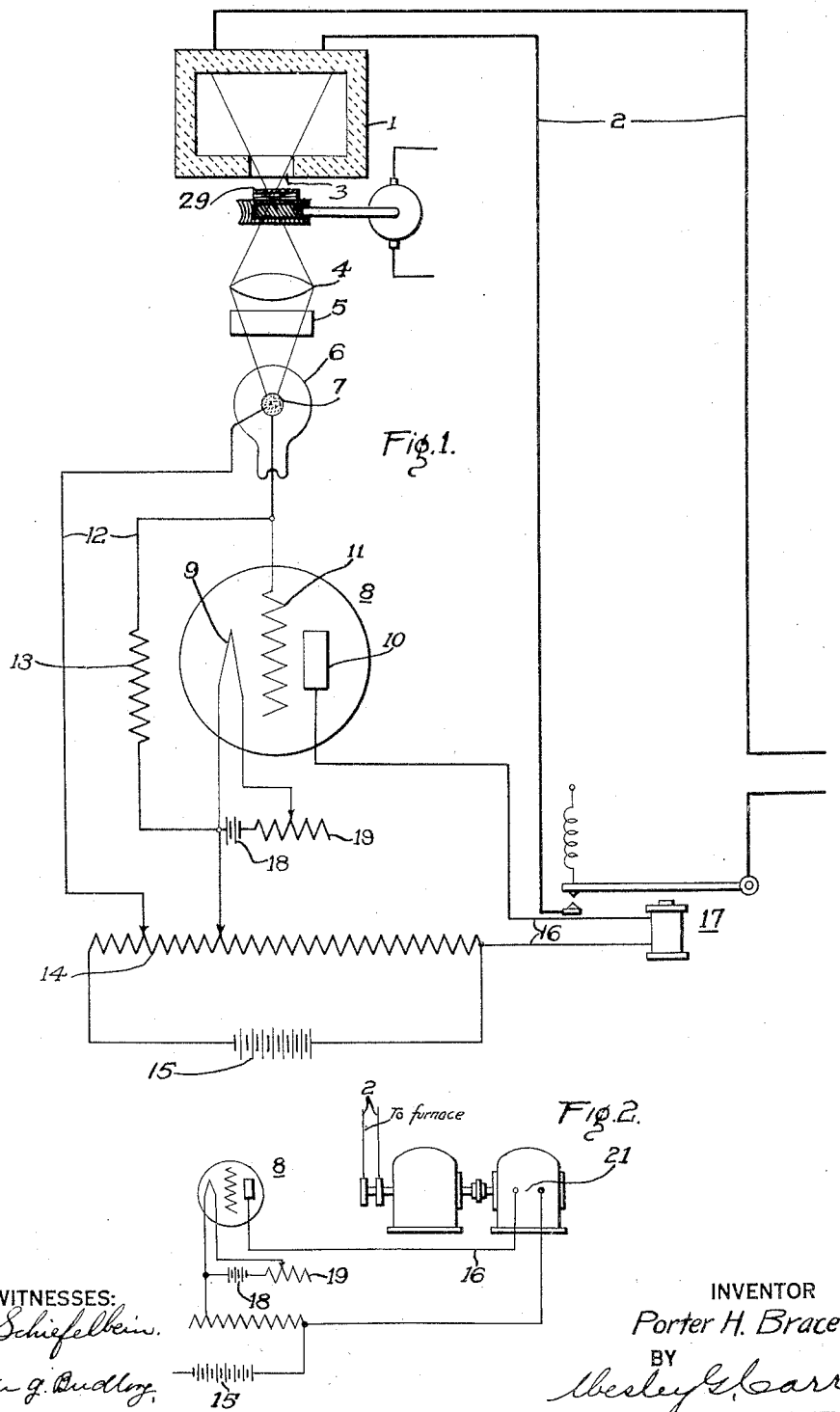
Figure 1 is a diagrammatic view of a system of electrical circuits and apparatus embodying my invention.
Fig. 2 is a diagrammatic view of a portion of a system of electrical circuits and apparatus embodying a modified form of my invention.

In the preferred embodiment of my invention, as shown in Fig. 1, a thermal member 1, such as a furnace, a crucible, retort or the like, that is controlled either directly or indirectly by an electrical circuit 2, is provided with an opening 3. A condensing lens 4 and a water cell 5 are placed in alinement between the opening 3 and a photo-electrical cell 6 equipped with an electrode 7 which may be of any desired type.

An electron discharge device 8 comprising the usual filament 9, plate 10 and grid 11, is connected to the electrode 7. A circuit 12 comprising a resistor 13, a variable resistor 14 and a source of electro-motive force 15 is controlled by the photo-electrical cell 6 and in turn controls the potential of the grid member 11.

A circuit 16 is energized by the source of electromotive force 15, the current traversing a portion of the variable resistance 14, filament 9, grid 11, plate 10 and an electrical translating device 17, which is shown in Fig. 1 as a circuit interrupter controlling the electrical circuit 2. A suitable source of electromotive force 18 and a variable resistance 19 are provided for supplying heating current to the filament 9.

In the operation of my control system, the thermal member 1 is heated by any suitable means that is subject to control in accordance with the value of the current traversing the circuit 2, or in accordance with the heating action of the electrical current itself, radiant energy being emitted through the opening 3 and focused by the lens 4 upon the electrode 7 of the photo-electric cell 6. Water cell 5 may, if desired, be placed between the lens 4 and the cell 6, in order to absorb any thermal rays as distinguished from light rays which may be emitted from the thermal member 1.

The light rays entering the cell 6 permit a variation in the current traversing the electrical circuit 12 in accordance with the well-known characteristics of photo-electric cells. The resistor 13 limits the maximum current which may traverse this circuit and also establishes a differential in voltage between the terminals thereof in direct proportion to the current traversing the circuit. As the value of the current in the circuit 12 varies according to the changes in the photo-electrical cell 6, the voltage of the grid 11 will vary in accordance with the well-known IR drop of the circuit 12.

The value of the current which normally traverses the circuit 16 and the translating devices 17, is controlled by the variable resistor 14 and the normal capacity of the electron discharge device 8. Under normal operating conditions, the value of the current traversing the circuit 2 is constant and a constant temperature accordingly obtains in the thermal member 1. However, with changes in the voltage of the grid 11 which is controlled in accordance with the excitation of the photo-electrical cell 6, the rate of electron discharge between the filament 9 and the plate 10 is varied in the well-known manner characteristic of electron discharge devices. By calibration of the sources of electromotive force 15 and 18 and the resistors 14 and 19 with respect to the potential of the grid 11, it is possible to vary the value of the current traversing electron discharge device 8 and the circuit 16 to such extent as to cause the closing or interrupting of the circuit 2, as desired.

In either event, a change is produced in the value of the current traversing the circuit 2 which is reflected in a change of the temperature conditions in the thermal member 1, and in a corresponding change in the radiant energy which is emitted therefrom. By calibrating the relation between the desired current value at the plate 10 and the current required to operate the member 17, it is possible to design my system of control for a constant temperature or for a given cycle of temperatures of the thermal member 1. In the latter case, a suitable time lag may be given to the member 17 so that a cycle of thermal changes in the member 1 may be followed by a corresponding change in the electrical current traversing the circuit 2.

It is also possible to regulate the temperature cycle of the thermal member 1 by placing a diaphragm 20 of the iris type in front of the lens 4 which may be made to open or to close according to any time cycle, thereby definitely increasing or decreasing the amount of radiant energy which is permitted to reach the photo-electrical cell 6.

Experiment has shown that with a potential of approximately 200 volts across the photo-electrical cell 6, and approximately 300 volts from the filament 9 to the grid 11 and with the resistor 13 having a value of 1000 megohms, changes in the plate current amounting to 10 milliamperes or more may be produced in the plate circuit 16 on increasing the temperature of the furnace from 700° C. to 1600° C. This apparatus is particularly well adapted to temperature control in the higher ranges where well-known thermo-couples are destroyed.

Alternating current may be used in this system by substituting a small transformer for the source of electro-motive force 18. With alternating current, the electron discharge device acts as a rectifier and permits the passage of current in but a single direction thereby reducing the effective value of the current by one-half. The alternating current system is somewhat less sensitive than the direct current system and necessarily has to be designed to effectively care for the diminished strength of the alternating electrical currents.

In the modification shown in Fig. 2, the circuit 16 controls the energization of the field winding of the motor 21 of a motor-generator set which supplies energy to the circuit 2. The current traversing circuit 16 is varied in accordance with the emission of radiant energy from the thermal member 1, in the manner described in the preferred form of my invention.

The variations in current traversing the field windings of the motor 21 effect a proportionate change in motor speed, which in turn, effects the electro-motive force impressed upon the circuit 2, and accordingly, the temperature of the thermal member 1. In all other particulars, the two forms of my invention are similar.

By my invention, I have provided a system of thermal control which depends upon the radiant energy emitted from the member under control and accordingly it is not necessary to place any portion of the system at a point where it will be subjected to the highest temperature of the thermal member under control. I have also provided a system of control in which a photo-electric cell and an electron discharge device are combined for the purpose of utilizing the radiant energy, and particularly the light rays, emitted by the device under control.

While I have shown and described the preferred form of my invention, it is to be understood that such changes may be made in the same as shall fall within the scope of the appended claims.

I claim as my invention:

1. In a thermal control system, the combination with a source of radiant energy to be controlled, a photo-electrical cell energized by said source of radiant energy, an electron-discharge device controlled by said photo-electrical cell, and means for preventing heat rays from said source affecting said cell, of means for varying the amount of radiant energy affecting said cell in a predetermined time cycle.

2. In combination, an electron-discharge device for controlling a source of radiant energy, a photo-electric cell energized from the source of radiant energy for controlling said electron-discharge device, and means for controlling the amount of radiant energy emitted to said photo-electric cell in accordance with a predetermined time-temperature cycle.

3. In combination, an electron-discharge device for controlling the thermal condition of a radiant body, a device responsive to the thermal condition of a radiant body for controlling the electron-discharge device, and means for controlling the energization of said second named device in accordance with a time-temperature cycle.

In testimony whereof, I have hereunto subscribed my name this first day of February, 1923.

PORTER H. BRACE.